US012539579B2

(12) United States Patent
Yan

(10) Patent No.: US 12,539,579 B2
(45) Date of Patent: Feb. 3, 2026

(54) SELF-ADAPTIVE SELF-LOCKING CLAMPING APPARATUS

(71) Applicant: Geng Yan, Calgary (CA)

(72) Inventor: Geng Yan, Calgary (CA)

( * ) Notice: Subject to any disclaimer, the term of this patent is extended or adjusted under 35 U.S.C. 154(b) by 88 days.

(21) Appl. No.: 18/184,656

(22) Filed: Mar. 16, 2023

(65) Prior Publication Data

US 2024/0278387 A1 Aug. 22, 2024

Related U.S. Application Data

(60) Provisional application No. 63/447,333, filed on Feb. 21, 2023.

(51) Int. Cl.

| | |
|---|---|
| ***B25B 5/04*** | (2006.01) |
| ***B25B 5/16*** | (2006.01) |
| ***B25B 7/04*** | (2006.01) |
| ***B25B 7/16*** | (2006.01) |

(52) U.S. Cl.

CPC ................ *B25B 5/04* (2013.01); *B25B 5/163* (2013.01); *B25B 7/04* (2013.01); *B25B 7/16* (2013.01)

(58) Field of Classification Search

CPC .... B25B 7/14; B25B 7/16; B25B 7/04; B25B 5/04; B25B 5/163

See application file for complete search history.

(56) References Cited

U.S. PATENT DOCUMENTS

| | | | | | |
|---|---|---|---|---|---|
| 1,772,428 | A * | 8/1930 | Palotce | B25B 7/16 | 81/319 |
| 2,249,661 | A * | 7/1941 | Littlefield | B25B 7/18 | 81/328 |
| 2,595,989 | A * | 5/1952 | Smeltz | A61D 15/00 | 43/53.5 |
| 4,052,917 | A * | 10/1977 | Gee | B67B 7/18 | 81/185.1 |
| 5,408,904 | A * | 4/1995 | Neff | B25B 7/16 | 81/319 |
| 6,860,179 | B2 * | 3/2005 | Hopper | B25B 7/04 | 81/319 |
| D524,612 | S * | 7/2006 | Wakasugi | D8/18 | |
| 7,069,815 | B1 * | 7/2006 | Yu | B67B 7/14 | 81/3.4 |
| 2012/0042709 | A1 * | 2/2012 | Polofsky | B25B 7/16 | 81/364 |
| 2013/0249154 | A1 * | 9/2013 | Li | B25B 7/14 | 269/6 |

* cited by examiner

*Primary Examiner* — Seahee Hong

(57) ABSTRACT

The self-adaptive self-locking clamping apparatus comprises a pair of arms pivotally interconnected to each other via a fulcrum either in the middle or on one end of the pair of arms, forming a pair of jaws with at least a variable gap for load, a fulcrum and a pair of handles for effort. The pair of handles engage with each other via a pawl and ratchet mechanism to achieve directional self-locking function, so that the clamping force applied to the pair of handles are maintained after such clamping force is removed. The self-locking pawl and ratchet engagement is self-adaptive to the geometric deformation of the pair of arms resulted from the elastic deformation caused by the clamping force, creating a firm locking grip so that a user does not have to keep maintaining the clamping force while in operation.

7 Claims, 9 Drawing Sheets

Section AB

Section AB

Section EF

Section EF

SELF-ADAPTIVE SELF-LOCKING CLAMPING APPARATUS

REFERENCE TO RELATED APPLICATIONS

This application claims the benefit of U.S. Provisional Application No. 63/447,333, filed on Feb. 21, 2023.

FIELD OF THE INVENTION

The present invention relates to a self-adaptive self-locking clamping apparatus that can provide adjustable clamping gap(s), clamping force and self-adaptive self-locking function for applications such as locking clamp, jar opener, oil filter wrench and many others. The present invention offers a variable gap(s) that can be quickly adjusted to adapt to a wide range of sizes of the underlining workpiece the apparatus is operated on, such as lumbers, jar lids and oil filters, and can provide adjustable clamping force and self-locking function. The present invention also offers self-adaptive locking mechanisms to maintain the self-locking engagements when the body of the clamping apparatus is geometrically and elastically deformed under stress.

BACKGROUND OF THE INVENTION

In many applications such as jar opener, oil filter wrench, wood clamp and many others, the clamping apparatus is required to have a variable clamping gap(s) that can be quickly adjusted to adapt to a wide range of sizes of the underlining workpiece it is operated on, such as the jar lid diameters, oil filter diameters and lumber widths, etc. In such applications the apparatus is also required to provide sustaining clamping force on the underlining workpiece when in operation, so that friction can be generated to firmly lock the workpiece in a position, such as in the wood clamp application; or for twisting operation, such as in the jar opener and oil filter wrench applications. This creates the needs for a clamping apparatus that can provide a quick clamping gap and force adjustment, as well as a self-locking mechanism so that a user does not have to keep applying the clamping force while in operation. The self-locking mechanism is especially beneficial to a wide range of users who either have weak hand grip due to old age or illnesses such as arthritis, or do not have the dexterity to coordinate applying proper clamping force while operating the apparatus.

In the application as wood clamp, which employs scissor linkage connection so that it has a fulcrum in the middle of the body and the load and effort are distributed on both sides of the fulcrum, there are devices exist in prior art and commercially available tools utilizing circular movement pawl and ratchet self-locking mechanisms similar to this invention. However, there is a major issue of these devices to prevent them from being effectively used in real life, which is the geometric elastic deformation of the clamping device caused by the clamping force may destabilize the pawl and ratchet self-locking mechanism, due to that the required circular movement path of the self-locking parts cannot maintain constant. As the result the self-locking parts may either jam or disengage when the device is undergoing significant stress and geometric deformation. In the applications of jar opener and oil filter wrench, due to that these devices have the fulcrum located on one end and the load and effort on the other end, which further exacerbates the deformation issue, no similar self-locking means are currently utilized and people conventionally rely on open-end clamping mechanism without self-locking function in the jar opener application, and strap type wrench or plier wrench in the oil filter wrench application.

Therefore, there are strong needs for this invention that can provide quick adjustable clamping gap and clamping force, and self-adaptive self-locking mechanisms to maintain the clamping gap and clamping force even under stress and deformation.

SUMMARY OF THE INVENTION

The primary object of the present invention is to provide self-adaptive self-locking mechanisms that can offer quick clamping gap and force adjustment and self-adaptive self-locking function.

The second object is to provide a self-adaptive self-locking mechanism via an integrated pawl and ratchet locking mechanism for applications that require high clamping force.

The other object is to provide a self-adaptive self-locking mechanism via an individual pawl and ratchet locking mechanism for applications that require significantly high clamping force so that the load can be evenly distributed among multiple pawl and ratchet teeth.

To the accomplishment of the above and related objects, this invention may be embodied in the preferred embodiments illustrated in the accompanying drawings. It should be noted however, that the drawings are illustrative only, and that various embodiments can be made to achieve the same objectives.

BRIEF DESCRIPTION OF DRAWINGS

Various other objects, features and advantages of the present invention will become fully appreciated and better understood when considered in conjunction with the accompanying drawings, wherein for the preferred embodiments.

DETAILED DESCRIPTION OF THE INVENTION

Figure 1:
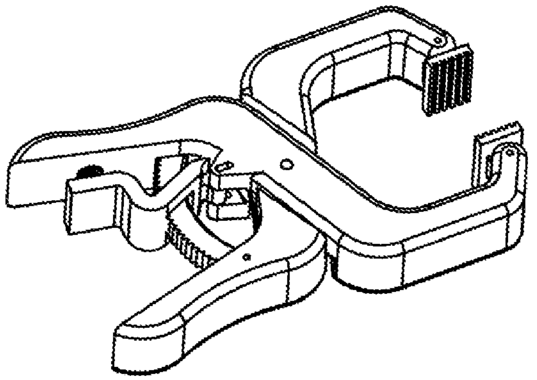
FIG. 1 is a perspective view of a preferred embodiment of a self-adaptive self-locking clamping apparatus in the application as a locking clamp (referred to as locking clamp hereon).

Described below are the preferred embodiments of the present invention, which illustrate ways in which the invention may be implemented. Although the embodiments shown are described in the context of locking clamp, jar opener and oil filter wrench, the invention can also be used in many other applications that will benefit from sustaining clamping force with a self-adaptive self-locking function, such as lemon squeezer and many others. In the descriptions that follow, the preferred embodiments are disclosed in detail to illustrate the principles of the invention. Therefore, it should be noted that the preferred embodiments are merely respective forms of the many potential embodiments in many applications, and the structural and functional details described herein are not intended to be limiting of the invention, but merely serve as the exemplary representations and the principles of the present invention.

In the disclosure the same reference characters represent the same elements in all figures. The references of "up", "down", "upper", "lower", "top", "bottom", "vertical", "horizontal", "front", "rear" and so on are based on the positions shown on the views. Terms like "first", "second", "third", "forth", "last", "one", "another", "on one end", "on the other end" and so on are used to arbitrarily distinguish the elements in relation to the position and/or the sequence of a description or illustration. On the figures with combination of orthographic, sectional and perspective views, the reference characters may not be indicated to avoid reducing legibility of the drawing details, however the components will become obvious on the other views.

Figure 2:
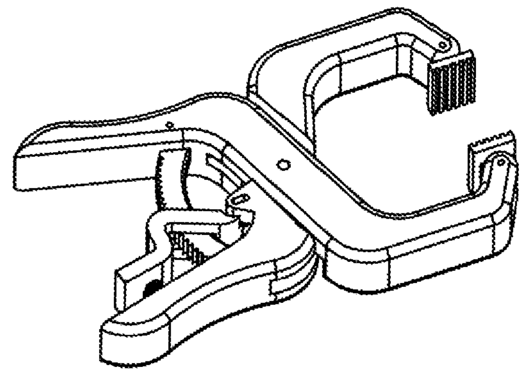
FIG. 2 is a perspective view of the locking clamp of FIG. 1 from an opposite direction.

FIG. 1 and FIG. 2 illustrate a self-adaptive self-locking clamping apparatus in an open position in a preferred embodiment as a locking clamp.

Figure 3:
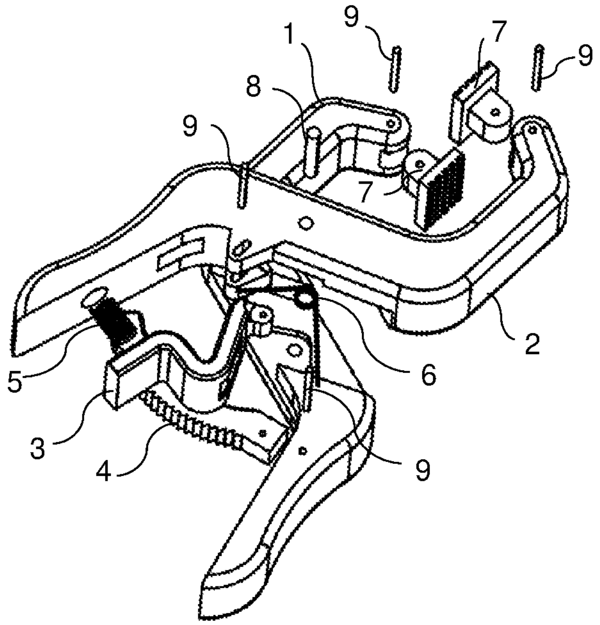
FIG. 3 is an exploded view of the locking clamp of FIG. 1.
Figure 4:
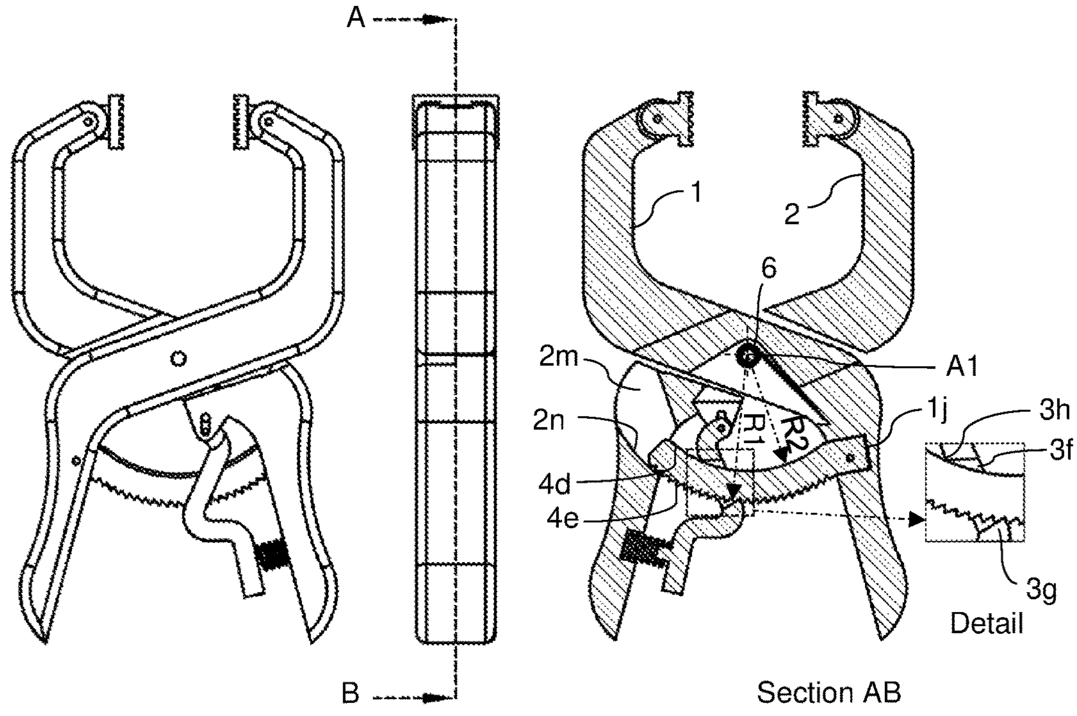
FIG. 4 is a combination of orthographic and sectional views of the locking clamp of FIG. 1.

FIG. 3 and FIG. 4 further show how the locking clamp is constructed. The locking clamp may comprise a first arm 1, a second arm 2, an integrated pawl trigger 3, a ratchet arc 4, a compression spring 5, a torsion spring 6, a pair of clamp heads 7, and a plurality of pins 8 and 9.

Figure 5:
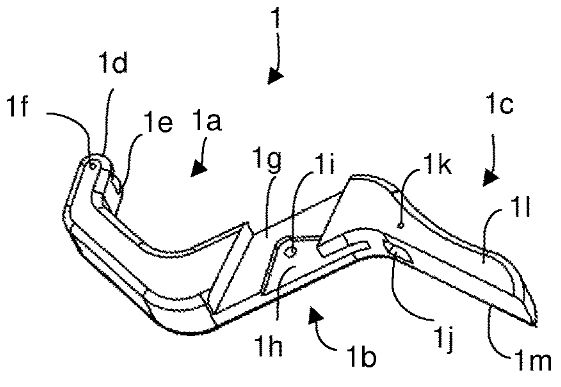
FIG. 5 is perspective view of a first arm that may be used on the locking clamp of FIG. 1.

The first arm 1 (FIG. 3, FIG. 4, FIG. 5) may have a similar to stretched "S" shape longitudinal body having a jaw section 1*a* on one end, connected by a pivot section 1*b* in the middle, followed by a handle section 1*c* on the other end. The longitudinal edges 1*l* and 1*m* define the width of the first arm 1. A pair of spaced apart hinge seats 1*d* and 1*e* generally parallel and symmetric to the center plane AB (FIG. 4) are disposed at the end of the jaw section 1*a*. A bore hole 1*f* generally perpendicular to the plane AB is bored through the pair of hinge seats 1*d* and 1*e* to pivotally receive a clamp head 7 via a first pin 9 (FIG. 3). The pivot section 1*b* may further comprise a step-down coupling surface 1*g* offset from the longitudinal edge 1*l* to couple with corresponding coupling surface of the second arm 2 to form a scissor linkage, a similar to "V" shape recess 1*h* to receive the torsion spring 6, and a bore hole 1*i* generally perpendicular to the plane AB and through the recess 1*h* to pivotally connect with the torsion spring 6 and coaxially aligned with the corresponding bore hole on the second arm 2 to form a spring pivot and a fulcrum via a pin 8. The handle section 1*c* may further comprise a recess 1*j* sized and shaped to stationarily receive the anchor end of the ratchet arc 4, and a bore hole 1*k* generally perpendicular to the plane AB and through the recess 1*j* to fix the ratchet arc 4 in place via a second pin 9.

Figure 6:
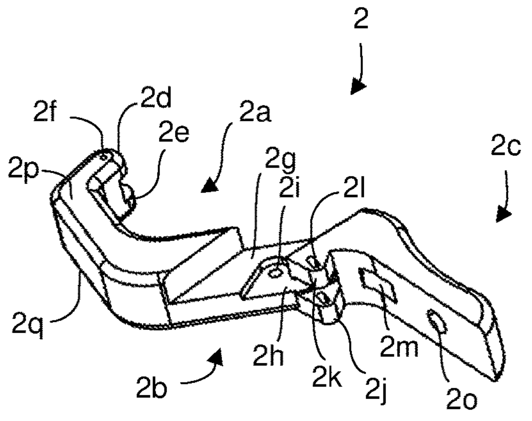
FIG. 6 is a perspective view of a second arm that may be used on the locking clamp of FIG. 1.

The second arm 2 (FIG. 3, FIG. 4, FIG. 6) may have a similar shape body as the first arm 1, which may comprise a jaw section 2*a* on one end, a pivot section 2*b* in the middle and a handle section 2*c* on the other end. The longitudinal edges 2*p* and 2*q* define the width of the second arm 2. A pair of spaced apart hinge seats 2*d* and 2*e* generally parallel and symmetric to the center plane AB (FIG. 4) are disposed at the end of the jaw section 2*a*. A bore hole 2*f* generally perpendicular to the plane AB is bored through the pair of hinge seats 2*d* and 2*e* to pivotally receive another clamp head 7 via a third pin 9 (FIG. 3). The pivot section 2*b* may further comprise a step-down coupling surface 2*g* offset from the longitudinal edge 2*p* to couple with the corresponding coupling surface 1*g* of the first arm 1 to form the scissor linkage, a similar to "V" shape recess 2*h* to pair up with the recess 1*h* to receive the torsion spring 6, and a bore hole 2*i* generally perpendicular to the plane AB and through the recess 2*h* to coaxially align with the corresponding bore hole 1*i* and pivotally connect with the torsion spring 6 to form the spring pivot and the fulcrum via the pin 8. The handle section 2*c* may further comprise a pair of spaced apart transversely protruding hinge seats 2*k* and 2*j* adjacent to the pivot section 2*b*, a slot 21 generally perpendicular to the plane AB cutting through the pair of hinge seats 2*k* and 2*j* to pivotally and slidably receive a fourth pin 9, a transverse pathway 2*m*, and a transverse circular recess 20 to stationarily received one end of the compression spring 5. The pathway 2*m* is designed in the way that a bottom arc surface 2*n* (FIG. 4) having a radius R1 that is centered on the axis A1 may slidably receive the ratchet arc 4.

Figure 7:
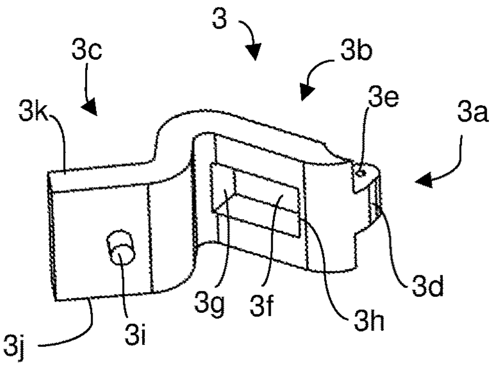
FIG. 7 is a perspective view of an integrated pawl trigger that may be used on the locking clamp of FIG. 1.

The integrated pawl trigger 3 (FIG. 3, FIG. 4, FIG. 7) may have a similar to trigger shape curvy longitudinal body comprising a hinge seat section 3*a*, an integrated pawl section 3*b* and a lever section 3*c*. The longitudinal edges 3*j* and 3*k* define the width of the integrated pawl trigger 3. The hinge seat section 3*a* having a hinge seat 3*d* offset from both longitudinal edges 3*k* and 3*j* and a bore hole 3*e* generally perpendicular to the plane AB (FIG. 4) is sized and shaped to be received into the gap between the pair of hinge seats 2*k* and 2*j* and in conjunction with the fourth pin 9 and the slot 21 to form a variable pivot, via which the integrated pawl trigger 3 pivots on the axis of the fourth pin 9, while the fourth pin 9 may movably slide in the slot 21. The travel limit pin and slot mechanism allows the integrated pawl trigger 3 to move up and down and rotate to self-adapt to the ratchet arc 4's movement resulted from the geometric deformation of the first and second arms 1 and 2 that is caused by the compressing force, so as to achieve the self-adaptive self-locking function. The integrated pawl section 3*b* may further comprise a transverse pathway 3*f* to slidably receive the ratchet arc 4, via which on the side adjacent to the lever section 3*c* an integral pawl tooth 3*g* and on the opposite side a compressing edge 3*h* that is generally perpendicular to the plane AB and significantly parallel to the edge of the integral pawl tooth 3*g* are also formed. The lever section 3*c* may further comprise a transversely protruding cylinder 3*i* to be stationarily received into another end of the compression spring 5.

In the preferred embodiment a single pawl tooth 3*g* is integrated to the integrated pawl trigger 3, however in other embodiments multiple pawl teeth may be integrated or mounted to the integrated pawl trigger 3.

Figure 8:
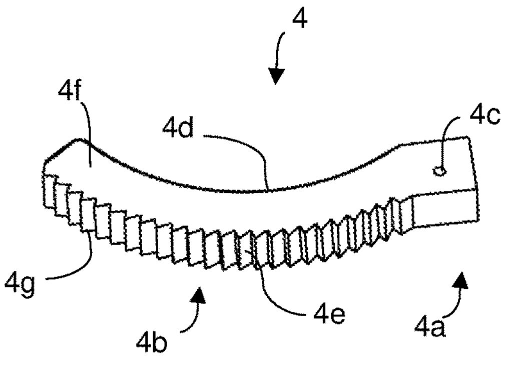
FIG. 8 is a perspective view of a ratchet arc that may be used on the locking clamp of FIG. 1.

The ratchet arc 4 (FIG. 3, FIG. 4, FIG. 8) may have a similar to arc shape longitudinal body comprising an anchor end 4*a* and a ratchet section 4*b*. The longitudinal edges 4*f* and 4*g* define the width of the body. The anchor end 4*a* having a bore hole 4*c* generally perpendicular to the plane AB (FIG. 4) is sized shaped to be stationarily received into the recess 1*j* and anchored on the first arm 1 via the coaxially aligned bore holes 1*k* and 4*c*, and the second pin 9. The ratchet section 4*b* may further comprise a lateral arc surface 4*d* having a radius R2 that is centered on the axis A1 when assembled, and a lateral arc integral ratchet face 4*e* having a radius R1 that is centered on the axis A1 when assembled (FIG. 4). The ratchet section 4*b* is sized and shaped to smoothly slide through the pathway 3*f* and the pathway 2*m* (FIG. 4).

In the assembled form, the coupled pivot section 1*b* and 2*b* in conjunction with the torsion spring 6 and the pin 8 form the scissor linkage spring pivot and the fulcrum on the axis A1 (FIG. 4); the jaw sections 1*a* and 2*a* pair up to form a pair of jaws with a variable gap to clamp on a workpiece; the handle sections 1*c* and 2*c* pair up to form a pair of handles to exert compressing force; the torsion spring 6 exerts spring force on the pair of handles to push the pair of handles apart; the integrated pawl trigger 3 is pivotally connected to the second arm 2 in the slot 21 and pivots at the bottom of the slot 21; the ratchet arc 4 is slidably received into the integrated pawl trigger 3 and the second arm 2; and the compression spring 5 supported between the second arm 2 and the integrated pawl trigger 3 exerts spring force on the integrated pawl trigger 3 so that the integrated pawl trigger 3 rotates away from the second arm 2 until the compressing edge 3*h* grips on the arc surface 4*d* on one side, and the integral pawl tooth 3*g* fully engages with the integral ratchet face 4*e* on the opposite side, therefore creates a pawl and ratchet self-locking mechanism. When a user exerts compressing force to the pair of handles, the ratchet arc 4 pushes the integrated pawl trigger 3 to rotate closer to the second arm 2 to disengage the pawl and ratchet engagement and slides further forward into the pathway 2*m*, resulting the gap of the pair of jaws to narrow. When the exerted compressing force is removed, the compression spring 5 pushes the integrated pawl trigger 3 to rotate away from the second arm 2, forcing the compressing edge 3*h* to grip on the arc surface 4*d* and the integral pawl tooth 3*g* to fully engage with the integral ratchet face 4*e*, and preventing the ratchet arc 4 from sliding backward. Therefore, the locking clamp is self-locked in a fixed position. When the integrated pawl trigger 3 is pulled closer to the handle section 2*c*, the compressing edge 3*h* and the integral pawl tooth 3*g* are lifted away from the arc surfaces 4*d* and integral ratchet face 4*e* so that the pawl and ratchet disengage, and the torsion spring 6 pushes the pair of handles further apart until the pair of jaws reach a maximum gap.

Figure 9:
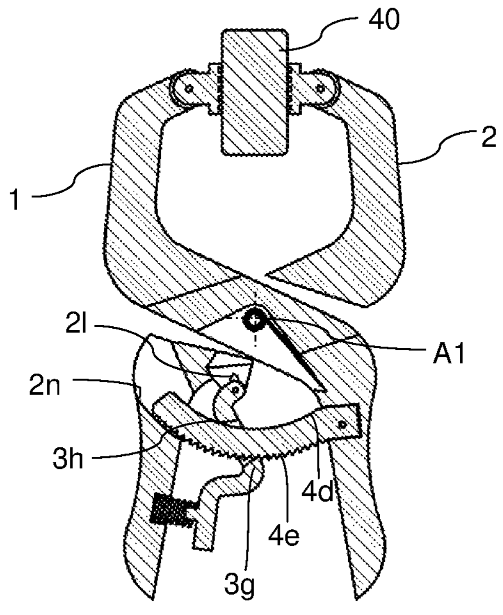
FIG. 9 is a sectional view of the locking clamp of FIG. 1 to illustrate the self-locking mechanism when the locking clamp is clamped on a piece of lumber in an ideal situation, of which no geometric deformation of the locking clamp occurs.
Figure 10:
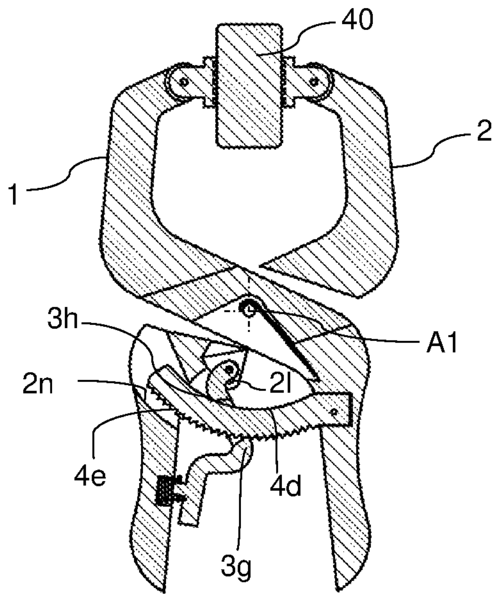
FIG. 10 is a sectional view of the locking clamp of FIG. 1 to illustrate the self-adaptive self-locking mechanism when the locking clamp is clamped on the piece of lumber in a real-life situation, of which geometric deformation of the locking clamp occurs.

FIG. 9 and FIG. 10 further illustrate how the self-adaptive self-locking mechanism works when the locking clamp is firmly clamped on a workpiece such as a piece of lumber 40 and the sustaining clamping force is maintained after the clamping force exerted by a user is removed. FIG. 9 shows a sectional view from the same plane AB on the FIG. 4 of an ideal situation, in which no geometric deformation occurs to both of the first and second arms 1 and 2. In such situation the ratchet arc 4 slides forward along the arc surface 2*n* in a circular motion in relation to the axis A1 and the pawl trigger 3 pivots in a bottom pivot position in the slot 21. FIG. 10 shows a sectional view from the same plane AB on the FIG. 4 of a real-life situation, in which geometric deformation occurs to both of the first and second arms 1 and 2 due to material elastic deformation under stress. In such situation the handle sections 1*c* and 2*c* are bent inwards, the ratchet arc 4 is tilted up away from the arc surface 2*n* and the integrated pawl trigger 3 is pushed up away from the bottom pivot position to pivot in another position in the slot 21, self-adapting to the ratchet arc 4's movement while maintaining the pawl and ratchet engagement, therefore the majority of the previously exerted clamping energy is stored in the form of elastic deformation of the first and second arm 1 and 2, and the strong grip on the underlining workpiece is maintained.

Figure 11:
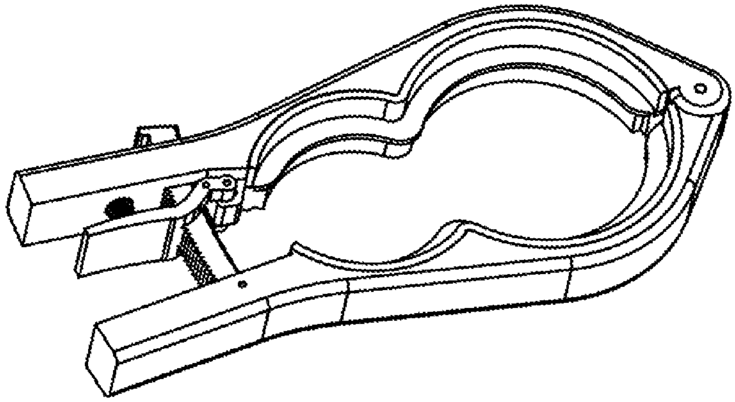
FIG. 11 is a perspective view of a preferred embodiment of a self-adaptive self-locking clamping apparatus in the application as a jar opener (referred to as jar opener hereon).
Figure 12:
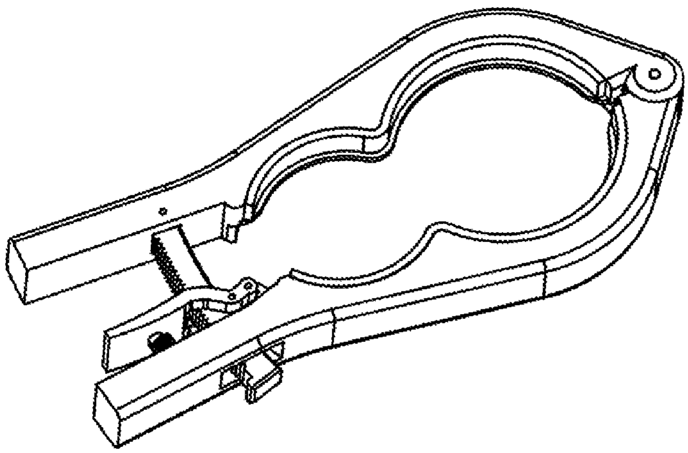
FIG. 12 is a perspective view of the jar opener of FIG. 11 from an opposite direction.

FIG. 11 and FIG. 12 illustrate a self-adaptive self-locking clamping apparatus in an open position in a preferred embodiment as a jar opener.

Figure 13:
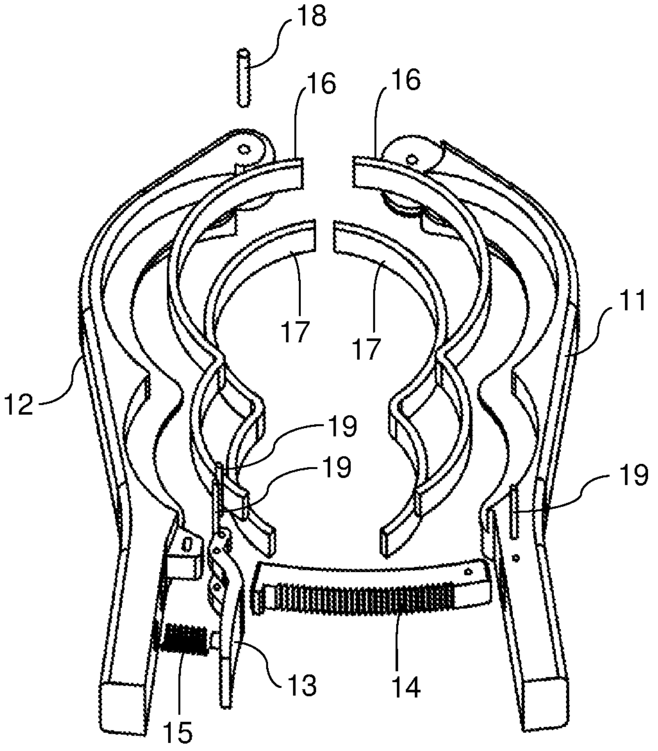
FIG. 13 is an exploded view of the jar opener of FIG. 11.
Figure 14:
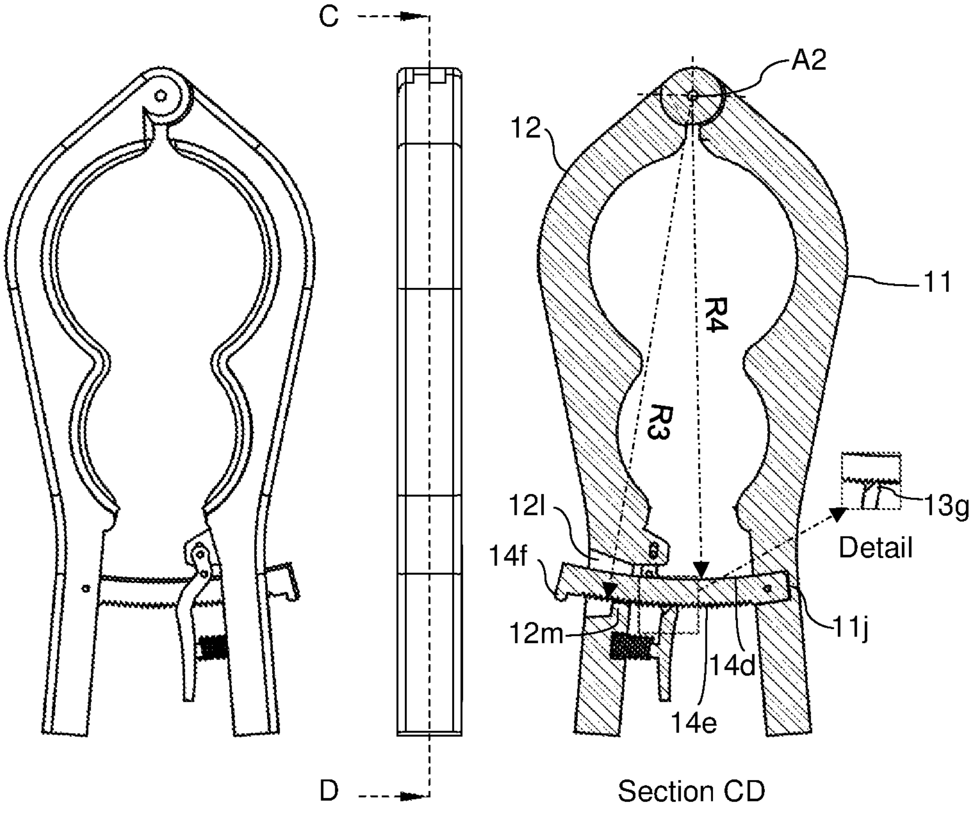
FIG. 14 is a combination of orthographic and sectional views of the jar opener of FIG. 11.

FIG. 13 and FIG. 14 further show how the jar opener is constructed. The jar opener may comprise a first arm 11, a second arm 12, an integrated pawl trigger 13, a ratchet arc 14, a compression spring 15, a pair of first clamping pads 16, a pair of second clamping pads 17, and a plurality of pins 18 and 19.

Figure 15:
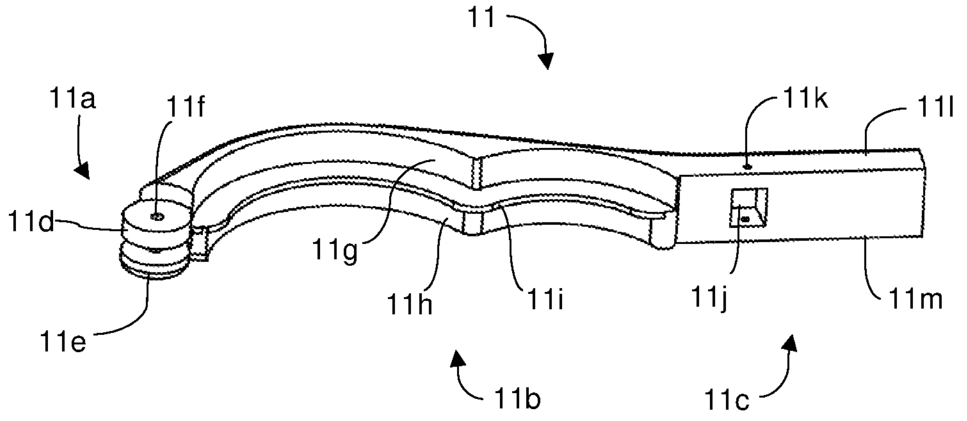
FIG. 15 is a perspective view of a first arm that may be used on the jar opener of FIG. 11.

The first arm 11 (FIG. 13, FIG. 14, FIG. 15) may have a curved longitudinal body, which may comprise a pivot section 11*a* on one end, connected by a twin jaw section 11*b* in the middle, followed by a handle section 11*c* on the other end. The longitudinal edges 111 and 11*m* define the width of the body. The pivot section 11*a* may further comprise a pair of spaced apart hinge seats 11*d* and 11*e* sized and shaped to couple with a corresponding pair of hinge seats on the second arm 12 to form a first pivot and a fulcrum, and a bore hole 11*f* generally perpendicular to the plane CD (FIG. 14) and though the pair of hinge seats 11*d* and 11*e* to pivotally receive a pin 18. The twin jaw section 11*b* may further comprise a first twin curved lateral surface 11*g*, a transverse twin curved reinforcement ridge 11*i* and a second twin curved lateral surface 11*h* stacking side-by-side width-wise. The first and second twin curved surfaces 11*g* and 11*h* are designed to couple with corresponding twin curved surfaces of the second arm 12, to form a pair of jaws with multiple variable gaps to cover the majority of commonly used standard and non-standard jar lid or container lid sizes, so that a single jar opener can act as a universal jar opener. The twin reinforcement ridge 11*i* is designed to enhance the rigidity of the first arm 11 and reduce geometric deformation when operated on a workpiece, and also act as supporting surfaces for a jar lid or container lid to enhance the friction between the jar lid or container lid and the jar opener and the stability of the operation. The twin reinforcement ridge 11*i* may be further coated with high friction material such as rubber to further enhance the stability and friction. The handle section 11*c* may further comprise a recess 11*j* sized and shaped to stationarily receive the anchor end of the ratchet arc 14, and a bore hole 11*k* generally perpendicular to the plane CD and through the recess 11*j* to fix the ratchet arc 14 in place via a first pin 19.

Figure 16:
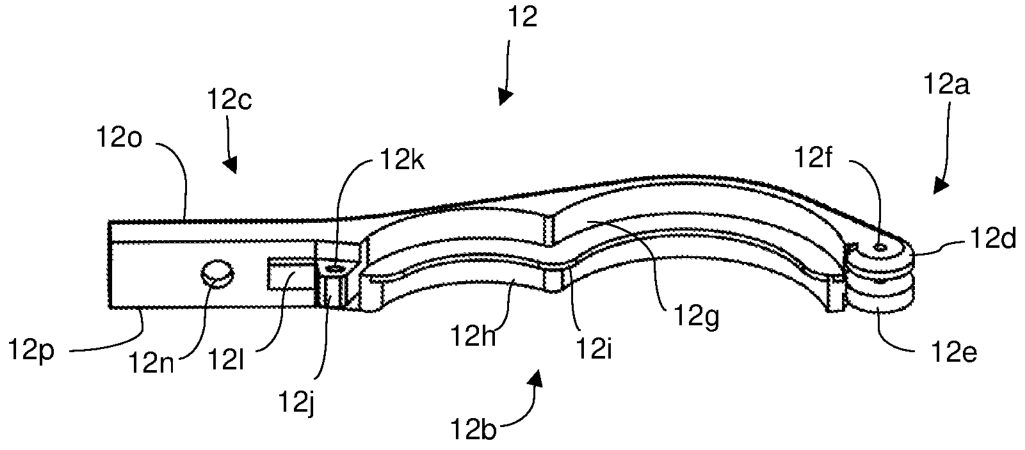
FIG. 16 is a perspective view of a second arm that may be used on the jar opener of FIG. 11.

The second arm 12 (FIG. 13, FIG. 14, FIG. 16) may have a similar shape body as the first arm 11, which may comprise a pivot section 12*a* on one end, a twin jaw section 12*b* in the middle and a handle section 12*c* on the other end. The longitudinal edges 120 and 12*p* define the width of the body. The pivot section 12*a* may further comprise a pair of spaced apart hinge seats 12*d* and 12*e* sized and shaped to couple with the corresponding pair of hinge seats 11*d* and 11*e* on the first arm 11 to form the first pivot and the fulcrum, and a bore hole 12*f* generally perpendicular to the plane CD (FIG. 14) and though the pair of hinge seats 12*d* and 12*e* to coaxially align with the bore hole 11*f* and pivotally receive the pin 18. The twin jaw section 12*b* may have identical structure and functionality as the corresponding twin jaw section 11*b*, which may comprise a first twin curved lateral surface 12*g*, a transverse twin curved reinforcement ridge 12*i* and a second twin curved lateral surface 12*h* stacking side-by-side width-wise. The handle section 12*c* may further comprise a transversely protruding hinge seat 12*j* adjacent to the twin jaw section 12*b* with both longitudinal edges offset from the longitudinal edges 120 and 12*p*, a slot 12*k* disposed generally along the longitudinal direction and perpendicular to the plane CD cutting through the hinge seats 12*j* to pivotally and slidably receive a second pin 19, a transverse pathway 121 adjacent to the hinge seat 12*j* to slidably receive the ratchet arc 14, and a transverse circular recess 12*n* to stationarily received one end of the compression spring 15. The pathway 121 is designed in the way that the pathway entry may have a threshold 12*m* (FIG. 14) to allow the ratchet arc 14 rest on and restrain the ratchet arc 14 from sliding backward out of the pathway.

Figure 17:
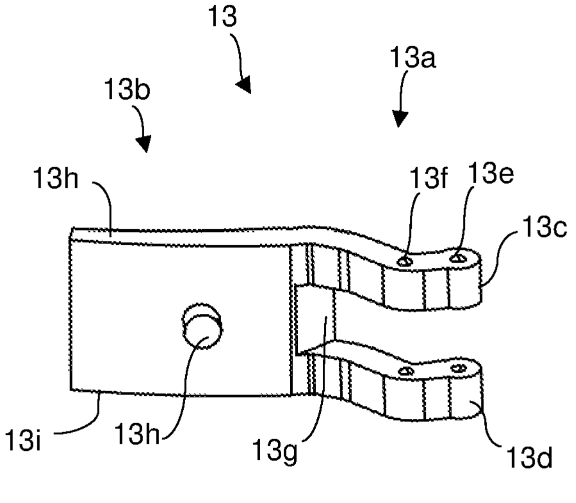
FIG. 17 is a perspective view of an integrated pawl trigger that may be used on the jar opener of FIG. 11.

The integrated pawl trigger 13 (FIG. 13, FIG. 14, FIG. 17) may have a similar to trigger shape curvy longitudinal body comprising a hinge seat section 13*a* and an integrated pawl lever section 13*b*. The longitudinal edges 13*h* and 13*i* define the width of the body. The hinge seat section 13*a* may further comprise a pair of forked arms 13*c* and 13*d* forked along the longitudinal edges 13*h* and 13*i* from the integrated pawl lever section 13*b* and generally symmetric to the plane CD (FIG. 14), a first bore hole 13*e* on the end of the hinge seat section 13*a* generally perpendicular to the plane CD and through the pair of the forked arms 13*c* and 13*d*, and a second bore hole 13*f* in the middle generally parallel to the first bore hole 13*e* and through the pair of the forked arms 13*c* and 13*d*. The pair of forked arms 13*c* and 13*d* may couple with the hinge seat 12*j* and the bore hole 13*e* may align with the slot 12*k* to stationarily receive the second pin 19 to form a variable pivot, via which the integrated pawl trigger 13 pivots on the axis of the second pin 19, while the second pin 19 may movably slide in the slot 12*k*. The second bore hole 13*f* may stationarily receive a third pin 19 to form a compressing edge for the integrated pawl trigger 13 and a pathway for the ratchet arc 14. The travel limit pin and slot mechanism allows the integrated pawl trigger 13 to move up and down and rotate to self-adapt to the ratchet arc 14's movement resulted from the geometric deformation of the first and second arms 11 and 12 that is caused by the compressing force, so as to achieve the self-adaptive self-locking function. The integrated pawl lever section 13*b* may further comprise an integral pawl tooth 13*g* adjacent to and between the pair of forked arms 13*c* and 13*d*, and a transversely protruding cylinder 13*j* in the middle to be stationarily received into the other end of the compression spring 15. The space enclosed by the pair of forked arms 13*c* and 13*d*, the third pin 19 and the integral pawl tooth 13*g* form a pathway to slidably receive the ratchet arc 14.

In the preferred embodiment a single pawl tooth 13*g* is integrated to the integrated pawl trigger 13, however in other embodiments multiple pawl teeth may be integrated or mounted to the integrated pawl trigger 13.

Figure 18:
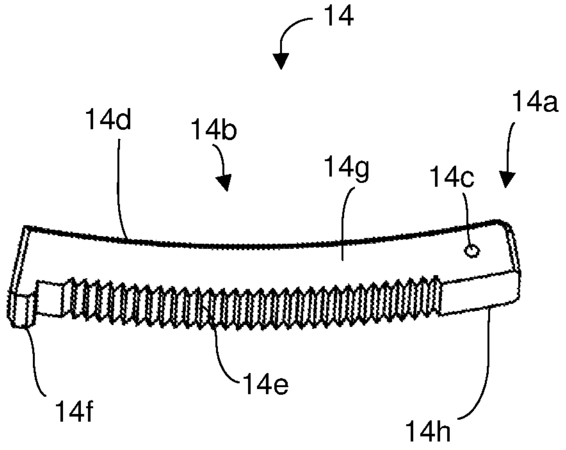
FIG. 18 is a perspective view of a ratchet arc that may be used on the jar opener of FIG. 11.

The ratchet arc 14 (FIG. 13, FIG. 14, FIG. 18) may have a similar to arc shape longitudinal body comprising an anchor end 14*a* and a ratchet section 14*b*. The longitudinal edges 14*g* and 14*h* define the width of the body. The anchor end 14*a* having a bore hole 14*c* generally perpendicular to the plane AB (FIG. 4) is sized shaped to be stationarily received into the recess 11*j* and anchored on the first arm 11 via the coaxially aligned bore holes 11*k* and 14*c*, and the first pin 19. The ratchet section 14*b* may further comprise a lateral arc surface 14*d* having a radius R4 that is centered on the axis A2 when assembled, a lateral arc integral ratchet face 14*e* having a radius R3 that is centered on the axis A2 when assembled (FIG. 14), and a transversely protruding stop ridge 14*f* at the end which in conjunction with the threshold 12*m* (FIG. 14) restrain the ratchet arc 14 from sliding backward out of the pathway 121. The ratchet section 14*b* is sized and shaped to smoothly slide through the pathway between the integrated pawl tooth 13*g* and the third pin 19 in the bore hole 13*f*, and the pathway 121 (FIG. 14).

The pair of first clamping pads 16 and the pair of second clamping pads 17 may be made of high friction and elastic material, such as rubber, and fused or bonded to the first and second twin curved surface 11*g* and 11*h* of the first arm 11, as well as the first and second twin curved surface 12*g* and 12*h* of the second arms 12 via suitable means. The clamping pads are employed to minimize the deformation of the workpiece and enhance friction for twisting operation.

In the assembled form, the pivot section 11*a* and 12*a* in conjunction with the pin 18 form the first pivot and the fulcrum on the axis A2 (FIG. 14); the twin jaw sections 11*b* and 12*b* pair up to form a pair of twin jaws with multiple variable gaps to clamp on a workpiece; the handle sections 11*c* and 12*c* pair up to form a pair of handles to exert compressing force; the integrated pawl trigger 13 is pivotally connected to the second arm 12 and pivots at the bottom of the slot 12*k*; the ratchet arc 14 is affixed to the first arm 11 on the anchor end 14*a*, and the ratchet section 14*b* is slidably received into the pathway between the integral pawl tooth 13*g* and the third pin 19 and the pathway 121, and rests on the threshold 12*m*; the compression spring 15 supported between the second arm 12 and the integrated pawl trigger 13 exerts spring force on the integrated pawl trigger 13 so that the integrated pawl trigger 13 rotates away from the second arm 12 until the third pin 19 grips on the arc surface 14*d* on one side, and the integral pawl tooth 13*g* fully engages with the integral ratchet face 14*e* on the opposite side, therefore creates a pawl and ratchet self-locking mechanism. When a user exerts compressing force on the pair of handles, the ratchet arc 14 pushes the integrated pawl trigger 13 to rotate closer to the second arm 12 to disengage the pawl and ratchet engagement and slides forward further into the pathway 121, resulting in the gaps of the pair of jaws to narrow. When the exerted compressing force is removed, the compression spring 15 pushes the integrated pawl trigger 13 to rotate away from the second arm 12, forcing the integral pawl tooth 13*g* to fully engage with the integral ratchet face 14*e* and the third pin 19 to grip on the arc surface 14*d*, and preventing the ratchet arc 14 from sliding backward. Therefore, the jar opener is self-locked in a fixed position. When the integrated pawl trigger 13 is pulled closer to the second arm 12, the third pin 19 and the integral pawl tooth 13*g* are lifted away from the arc surfaces 14*d* and integral ratchet face 14*e*, so that the pawl and ratchet disengage, allowing the pair of handles to move apart.

Figure 19:
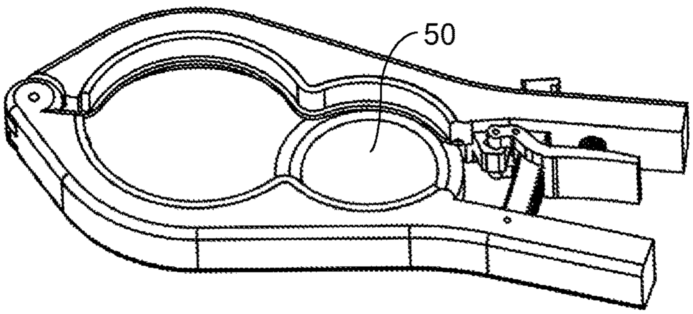
FIG. 19 is a perspective view to illustrate how the jar opener of FIG. 11 is operated on a jar lid.

FIG. 19 illustrates how the jar opener is operated to open a jar lid 50 (the jar body is not shown). A user may place the jar lid 50 between the pair of twin jaws, and exert clamping force on the pair of handles. The clamping force forces the gaps between the pair of twin jaws to narrow, resulting in the jar lid rim in contact with either the pair of first clamping pads 16 or the pair of second clamping pads 17 and the jar lid top in contact with one side of the reinforcement ridges 11*i* and 12*i*. The user may further exert clamping force on the pair of handles to force the corresponding elastic pair of clamping pads and the pair of first and second arms 11 and 12 to deform, creating a strong grip on the jar lid. The user may then turn the pair of the first and second arms 11 and 12 on a desired location, and utilize the resulting friction force exerted on the jar lid to disengage the jar lid from the jar, while not having to keep exerting the clamping force.

Figure 20:
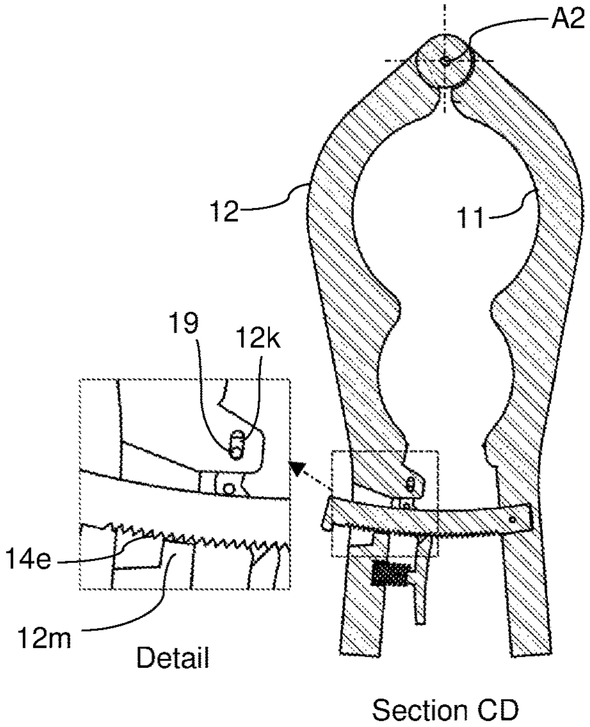
FIG. 20 is a sectional view of FIG. 19 to illustrate the self-locking mechanism when the jar opener is operated on the jar lid in an ideal situation, of which no geometric deformation of the jar opener occurs.
Figure 21:
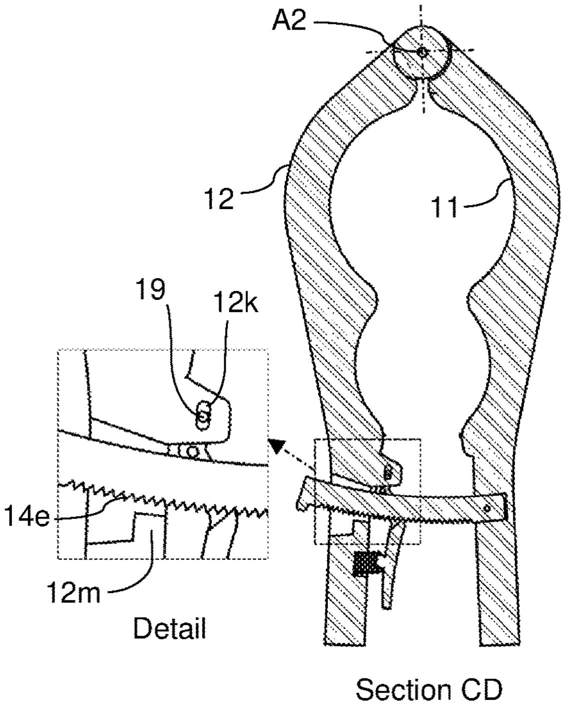
FIG. 21 is a sectional view of FIG. 19 to illustrate the self-adaptive self-locking mechanism when the jar opener is operated on the jar lid in a real-life situation, of which geometric deformation of the jar opener occurs.

FIG. 20 and FIG. 21 further illustrate how the self-adaptive self-locking mechanism works in the abovementioned operating example of FIG. 19. FIG. 20 shows a sectional view of the FIG. 19 from the same plane CD on the FIG. 14 of an ideal situation, in which no geometric deformation occurs to both of the first and second arm 11 and 12. In such situation the ratchet arc 14 slides along the threshold 12*m* in a circular motion in relation to the axis A2, and the integrated pawl trigger 13 pivots in a bottom position in the slot 12*k*. FIG. 21 shows a sectional view of the FIG. 19 from the same plane CD on the FIG. 14 of a real-life situation, in which geometric deformation occurs to both of the first and second arm 11 and 12 due to material elastic deformation under stress. In such situation the handle sections 11*c* and 12*c* are bent inwards, the ratchet arc 14 is tilted up away from the threshold 12*m* and the integrated pawl trigger 13 is pushed up away from the bottom pivot position to pivot in another position in the slot 12*k*, self-adapting to the ratchet arc 14's movement caused by the geometric deformation of both the first and second arms 11 and 12 while maintaining the pawl and ratchet engagement. Therefore, the majority of the previously exerted clamping energy is stored in the form of elastic deformation of the pair of first and second arms 11 and 12, and either the pair of first clamping pads 16 or the pair of second clamping pads 17, and the strong grip on the underlining workpiece is maintained.

Figure 22:
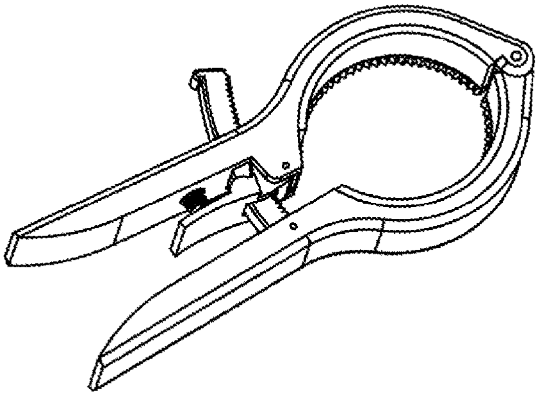
FIG. 22 is a perspective view of a preferred embodiment of a self-adaptive self-locking clamping apparatus in the application as an oil filter wrench (referred to as oil filter wrench hereon).
Figure 23:
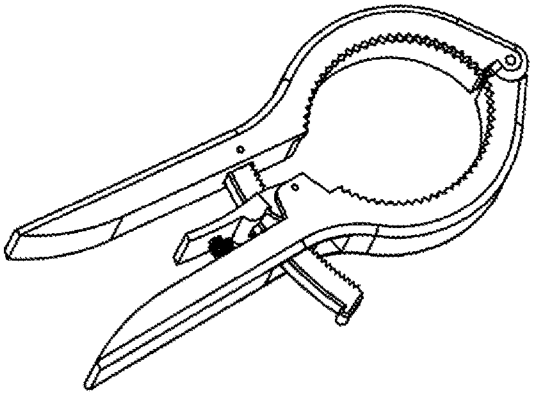
FIG. 23 is a perspective view the oil filter wrench of FIG. 22 from an opposite direction.

FIG. 22 and FIG. 23 illustrate a self-adaptive self-locking clamping apparatus in an open position in a preferred embodiment as an oil filter wrench.

Figure 24:
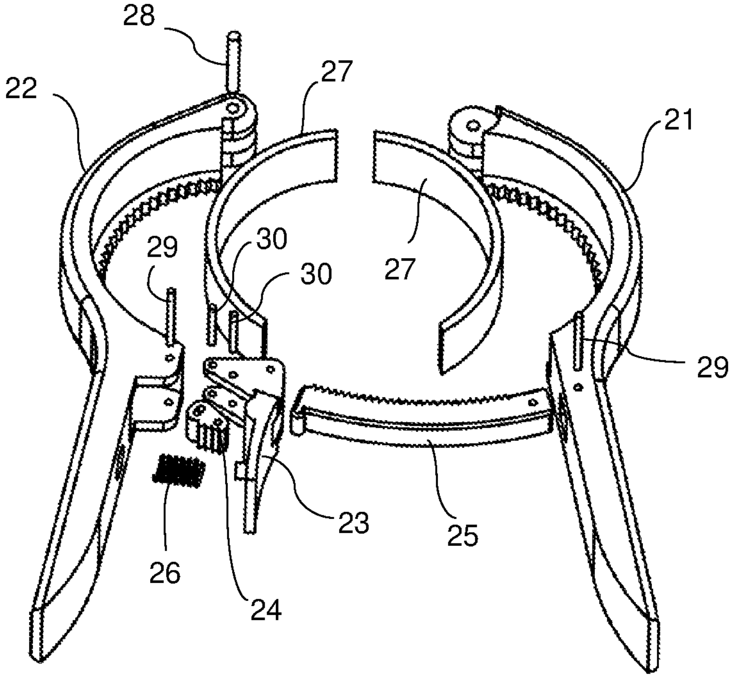
FIG. 24 is an exploded view of the oil filter wrench of FIG. 22.
Figure 25:
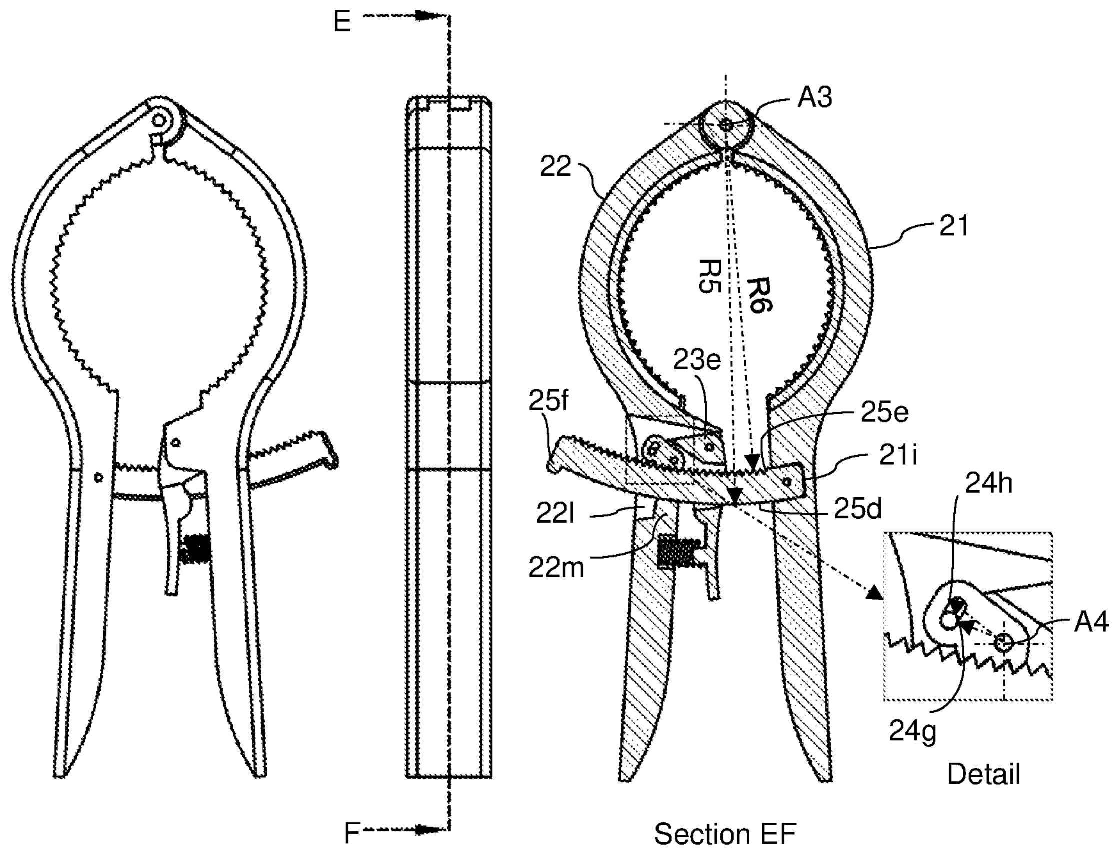
FIG. 25 a combination of orthographic and sectional views of the oil filter wrench of FIG. 22.

FIG. 24 and FIG. 25 further show how the oil filter wrench is constructed. The oil filter wrench may comprise a first arm 21, a second arm 22, a linkage trigger 23, a pawl 24, a ratchet arc 25, a compression spring 26, a pair of clamping pads 27, and a plurality of pins 28, 29 and 30.

Figure 26:
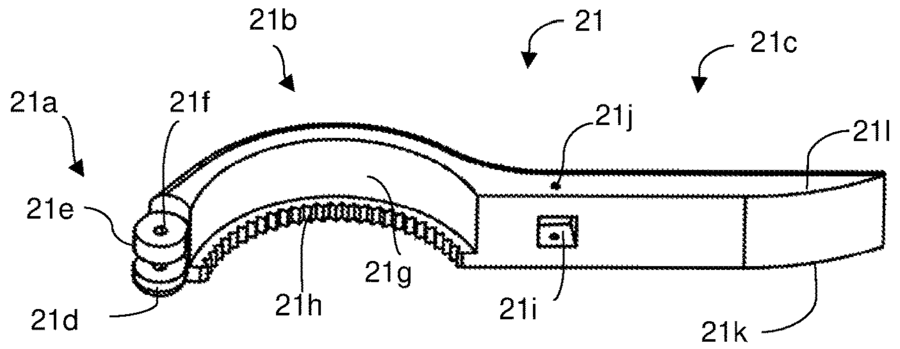
FIG. 26 is a perspective view of a first arm that may be used on the oil filter wrench of FIG. 22.

The first arm 21 (FIG. 24, FIG. 25, FIG. 26) may have a curved longitudinal body, which may comprise a pivot section 21*a* on one end, connected by a jaw section 21*b* in the middle, followed by a handle section 21*c* on the other end. The longitudinal edges 211 and 21*k* define the width of the body. The pivot section 21*a* may further comprise a pair of spaced apart hinge seats 21*d* and 21*e* sized and shaped to couple with a corresponding pair of hinge seats on the second arm 22 to form a first pivot and a fulcrum, and a bore hole 21*f* generally perpendicular to the plane EF (FIG. 25) and though the pair of hinge seats 21*d* and 21*e* to pivotally receive a pin 28. The jaw section 21*b* may comprise a curved lateral surface 21*g* and a curved transversely protruding toothed arc 21*h* stacking side by side width-wise. The curved surface 21*g* and toothed arc 21*h* are designed to pair up with corresponding curved surface and toothed arc on the second arm 22, to form a variable elastic gap and a variable hard-toothed gap to cover a range of commonly used oil filter sizes. The curved surface 21*g* is designed to bond or fuse with a high friction and elastic clamping pad 27, so that in tightening operation a user may clamp an oil filter in this elastic gap to twist the last a quarter of a turn after the oil filter is hand-tightened, without damaging the oil filter housing. The toothed arc 21*h* is designed to dent the oil filter housing so that a user may use this section in conjunction with the pair of clamping pads 27 to loosen the oil filter with enhanced grip. The handle section 21*c* may comprise a recess 21*i* sized and shaped to stationarily receive the anchor end of the ratchet arc 25, and a bore hole 21*j* generally perpendicular to the plane EF and through the recess 21*i* to fix the ratchet arc 25 in place via a first pin 29.

Figure 27:
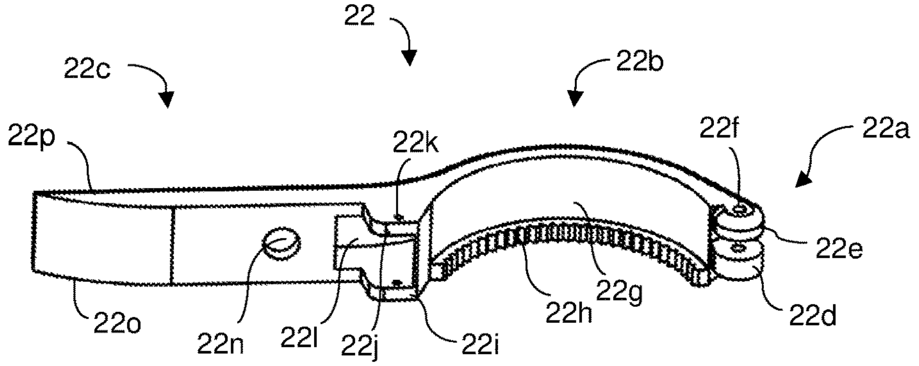
FIG. 27 is a perspective view of a second arm that may be used on the oil filter wrench of FIG. 22.

The second arm 22 (FIG. 24, FIG. 25, FIG. 27) may have a similar shape body as the first arm 21, which may comprise a pivot section 22*a* on one end, a jaw section 22*b* in the middle and a handle section 22*c* on the other end. The longitudinal edges 220 and 22*p* define the width of the body. The pivot section 22*a* may further comprise a pair of spaced apart hinge seats 22*d* and 22*e* sized and shaped to couple with the pair of hinge seats 21*d* and 21*e* on the first arm 21 to form the first pivot and the fulcrum, and a bore hole 22*f* generally perpendicular to the plane EF (FIG. 25) and though the pair of hinge seats 22*d* and 22*e* to coaxially align with the bore hole 21*f* and pivotally receive the pin 28. The jaw section 22*b* may have identical structure and functionality as the corresponding jaw section 21*b*, which may comprise a lateral curved surface 22*g* and a curved transversely protruding toothed arc 22*h* stacking side by side width-wise. The handle section 22*c* may further comprise a pair transversely protruding hinge seat 22*i* and 22*j* spaced a part along the longitudinal edges 220 and 22*p* and bridged on the jaw section 22*b* side, a bore hole 22*k* generally perpendicular to the plane EF and though the pair of hinge seats 22*i* and 22*j* to pivotally receive a second pin 29, a transverse pathway 221 extended from the opening between the pair of hinge seats 22*i* and 22*j* and cutting through the handle section 22*c* to slidably receive the ratchet arc 25, and a transverse circular recess 22*n* to stationarily receive one end of the compression spring 26. The pathway 221 is designed in the way that the pathway entry may have a threshold 22*m* (FIG. 25) to allow the ratchet arc 25 to rest on and restrain the ratchet arc 25 from sliding backward out of the pathway 221.

Figure 28:
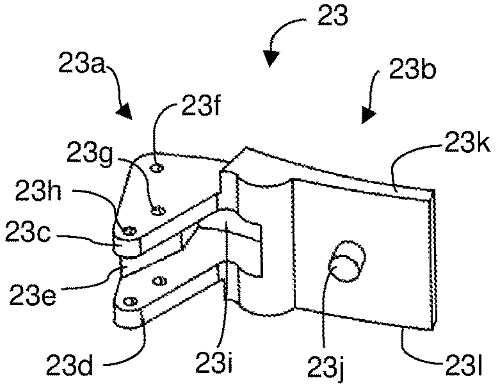
FIG. 28 is a perspective view of a linkage trigger that may be used on the oil filter wrench of FIG. 22.

The linkage trigger 23 (FIG. 24, FIG. 25, FIG. 28) may have a similar to trigger shape longitudinal body comprising a hinge seat section 23*a* and a lever section 23*b*. The longitudinal edges 23*k* and 231 define the width of the linkage trigger 23. The hinge seat section 23*a* may further comprise a pair of transversely forked arms 23*c* and 23*d* generally symmetric to the plane EF (FIG. 25) forked from the lever section 23*b* and offset from the longitudinal edges 23*k* and 231, a bridge 23*e* bridging the pair of forked arms 23*c* and 23*d* on the top end width-wise to enhance the rigidity of the linkage trigger 23, a first bore hole 23*f* generally perpendicular to the plane EF and through the bridge 23*e* on the adjacent end to the lever section 23*b* to form a hinge seat to pivotally connect with the pair of hinge seats 22*i* and 22*j* on the second arm 22 via the second pin 29 and form a second pivot; a second bore hole 23*g* generally parallel to the first bore hole 23*f* and through the pair of forked arm 23*c* and 23*d* to form a pair of hinge seats to pivotally connect with the pawl 24 via a first pin 30 and form a third pivot, and a third bore hole 23*h* on the other end generally parallel to the first bore hole 23*f* and through the pair of the forked arms 22*c* and 22*d* to form another pair of hinge seats to stationarily receive a second pin 30 and form a rotation limit. The lever section 23*b* may further comprise a transverse cutout at the end adjacent to the hinge seat section 23*a*, to form a pathway 23*i* that is extended from the gap between the pair of forked arms 23*c* and 23*d* to slidably received the ratchet arc 25, and a transversely protruding cylinder 23*j* in the middle to be stationarily received into the other end of the compression spring 26.

Figure 29:
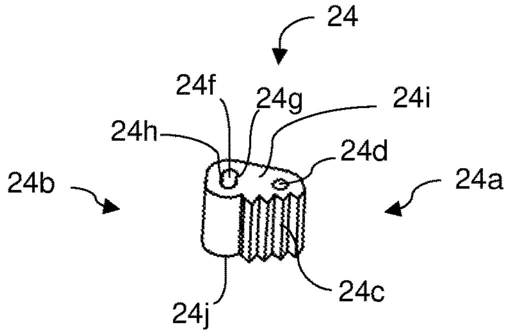
FIG. 29 is a perspective view of a pawl that may be used on the oil filter wrench of FIG. 22.

The pawl 24 (FIG. 24, FIG. 25, FIG. 29) may have a longitudinal body comprising a pawl head section 24*a* connected by a rotation limit section 24*b*. The longitudinal edges 24*i* and 24*j* define the width of the body. The pawl head section 24*a* may further comprise a lateral integral pawl face 24*c* consisting of a plurality of pawl teeth, a bore hole 24*d* generally perpendicular to the plane EF (FIG. 25) and though the pawl head section 24*a* to pivotally connect with the linkage trigger 23 on the third pivot via the coaxially aligned bore hole 23*g* and the first pin 30. The rotation limit section 24*b* may further comprise a curved slot 24*f* generally perpendicular to the plane EF and though the rotation limit section 24*b* to pivotally and slidably receive the second pin 30 that is fixed in the bore hole 23*h*. The slot 24*f* may further comprise a first arc surface 24*g* and a second arc surface 24*h* which are concentric to the axis A4 (FIG. 25), so that the pawl 24 may rotate around the axis A4 of the third pivot and the rotation range is limited within the slot 24*f* by the travel limit pin 30 and slot 24*f* mechanism. Therefore, the third pivot for the pawl 24 is a variable pivot, in that the third pivot may rotate around the second pivot, and the pawl may rotate around the third pivot. The variable pivot enables the pawl and ratchet engagement to self-adapt to the ratchet arc 25's movement resulted from the geometric deformation of the first and second arms 21 and 22 that is caused by the compressing force, so as to achieve the self-adaptive self-locking function.

Figure 30:
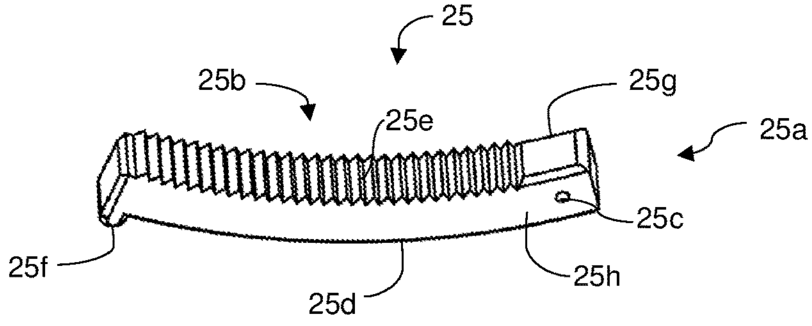
FIG. 30 is a perspective view of a ratchet arc that may be used on the oil filter wrench of FIG. 22.

The ratchet arc 25 (FIG. 24, FIG. 25, FIG. 30) may have a similar to arc shape longitudinal body comprising an anchor end 25*a* and a ratchet section 25*b*. The longitudinal edges 25*g* and 25*h* define the width of the body. The anchor end 25*a* having a bore hole 25*c* generally perpendicular to the plane EF (FIG. 25) is sized and shaped to be stationarily received into the recess 21*i* and anchored on the first arm 21 via the coaxially aligned bore holes 21*j* and 25*c*, and the first pin 29. The ratchet section 25*b* may further comprise a lateral arc surface 25*d* having a radius R5 that is centered on the axis A3 when assembled, a lateral arc integral ratchet face 25*e* having a radius R6 that is centered on the axis A3 when assembled (FIG. 25), and a transversely protruding stop ridge 25*f* at the end which in conjunction with the threshold 22*m* (FIG. 25) restrain the ratchet arc 25 from sliding backward out of the pathway 221. The ratchet section 25*b* is sized and shaped to smoothly slide through the pathway 23*i* and the pathway 221.

In the assembled form, the pair of pivot sections 21*a* and 22*a* in conjunction with the pin 28 form the first pivot and the fulcrum on the axis A3 (FIG. 25); the pair of jaw sections 21*b* and 22*b* pair up to form a pair of jaws with a variable elastic gap and a variable hard-toothed gap; the handle sections 21*c* and 22*c* pair up to form a pair of handles to exert compressing force; the ratchet arc 25 is affixed to the first arm 21 on the anchor end 25*a* via the first pin 29, and the ratchet section 25*b* is slidably received into the pathway 23*i* of the linkage trigger 23 and the pathway 221 of the second arm 22, and rests on the threshold 22*m*; the linkage trigger 23 is pivotally connected to the second arm 22 via the coaxially aligned bore holes 22*k* and 23*f* and the second pin 29, forming the second pivot, and is rotatable in the gap between the pair of hinge seats 22*i* and 22*j*, as well as in the pathway 221; the pawl 24 is pivotally connected to the linkage trigger 23 in the gap between the pair of forked arms 23*c* and 23*d* via the coaxially aligned bore holes 23*g*, 24*d*, and the first pin 30, and may rotate within the range of the slot 24*f* via the travel limit pin and slot mechanism formed by the second pin 30 and the slot 24*f*; and the compression spring 26 supported between the linkage trigger 23 and the second arm 22 exerts spring force on the linkage trigger 23 so that the linkage trigger 23 rotates away from the second arm 22 until the pawl 24 is fully engaged with the ratchet arc 25.

When a user exerts compressing force on the pair of handles, the ratchet arc 25 pushes up the pawl 24, resulting the linkage trigger 23 to rotate closer to the second arm 22 to disengage the pawl and ratchet engagement, while the second pin 30 in the bore hole 23*h* stays on the bottom of the slot 24*f* to restrain the pawl 24 from rotating on the axis A4 (FIG. 25) and enhance the stability of the relative movement; the ratchet arc 25 may slide forward further into the pathway 221, resulting in the gap of the pair of jaws to narrow. When the exerted compressing force is removed, the compression spring 26 pushes the linkage trigger 23 to rotate away from the second arm 22, forcing the pawl 24 to fully engage with the ratchet arc 25, and preventing the ratchet arc 25 from sliding backward. Therefore, the oil filter wrench is self-locked in a fixed position. When the linkage trigger 23 is pulled closer to the second arm 22, the pawl 24 is lifted up and the pawl and ratchet system disengages, allowing the pair of handles to move apart.

Figure 31:
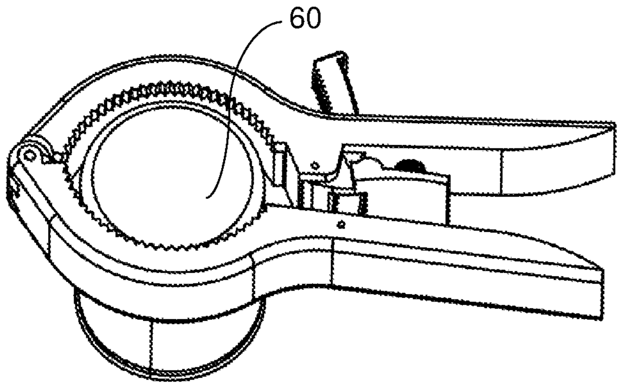
FIG. 31 is a perspective view to illustrate how the oil filter wrench of FIG. 22 is utilized to tighten an oil fitter.

FIG. 31 illustrates how a user may operate the oil filter wrench to tighten an oil filter 60. The user may hand-tighten the oil filter 60 on the engine block first, then place the oil filter between the pair of elastic pads 27, and exert clamping force on the pair of handles. The clamping force forces the gap between the first and second arms 21 and 22 to narrow, resulting in the oil filter housing in contact with the pair of clamping pads 27. The user may further exert clamping force on the pair of handles to force the pair of elastic clamping pads 27 and the first and second 21 and 22 to deform, creating desirable clamping pressure on the oil filter 60 while reducing the possibility of damaging the oil filter housing. The user may then turn the pair of first and second arms 21 and 22, and utilize the resulting friction force exerted on the oil filter 60 to twist the oil filter for the last a quarter of a turn to finish the oil filter tightening process, while not having to keep exerting the clamping force.

Figure 32:
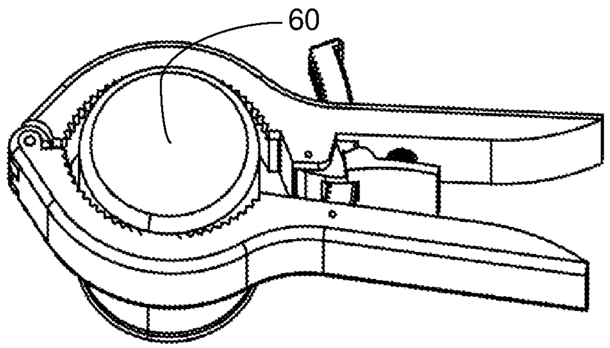
FIG. 32 is a perspective view to illustrate how the oil filter wrench of FIG. 22 is utilized to loosen the oil fitter.

FIG. 32 illustrates how the user may operate the oil filter wrench to loosen the oil filter 60. The user may place the oil filter 60 between the pair of clamping pads 27 and the pair of toothed arcs 21*h* and 22*h*, and exert clamping force on the pair of handles. The clamping force forces the gap between the first and second arms 21 and 22 to narrow, resulting in the oil filter housing in contact with the pair of toothed arcs 21*h* and 22*h*. The user may further exert clamping force on the pair of handles to force the teeth of the pair of toothed arcs 21*h* and 22*h* to dent into the oil filter housing, the pair of elastic clamping pads 27 and the first and second arms 21 and 22 to deform, creating a strong grip on the oil filter 60. The user may then turn the pair of first and second arms 21 and 22, and utilize the resulting friction force exerted on the oil filter 60 to turn and loosen the oil filter 60 from the engine block, while not having to keep exerting the clamping force.

Figure 33:
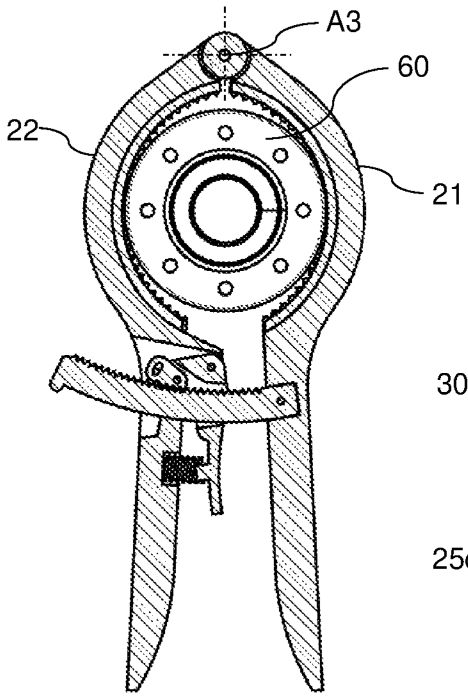
FIG. 33 is a hybrid sectional view of the oil filter wrench and projection view of the oil filter of FIG. 32 to illustrate the self-locking mechanism when the oil filter wrench is operated on the oil filter in an ideal situation, of which no geometric deformation of the oil filter wrench occurs.
Figure 34:
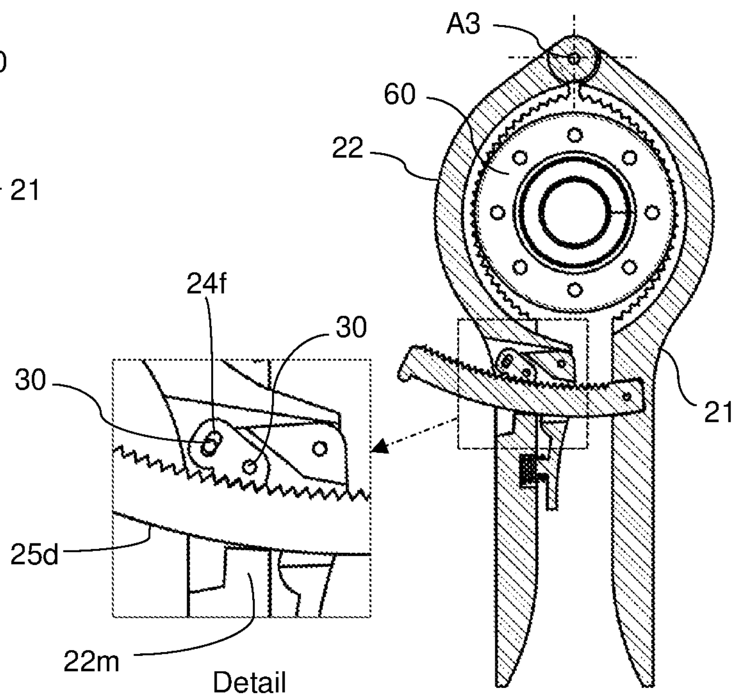
FIG. 34 is a hybrid sectional view of the oil filter wrench and projection view of the oil filter of FIG. 32 to illustrate the self-adaptive self-locking mechanism when the oil filter wrench is operated on the oil filter in a real-life situation, of which geometric deformation of the oil filter wrench occurs.

FIG. 33 and FIG. 34 further illustrate how the self-adaptive self-locking mechanism works in the abovementioned oil filter loosening example of FIG. 32. FIG. 33 shows a hybrid projection view of the oil filter 60 and sectional view of the oil filter wrench of the FIG. 32 from the same plane EF on the FIG. 25 of an ideal situation, in which no geometric deformation occurs to both of the first and second arms 21 and 22. In such situation the clamping force forces the ratchet arc 25 to push up the pawl 24 to disengage the pawl 24 from the ratchet arc 25, and slide along the threshold 22*m* in a circular motion in relation to the axis A3. When the clamping force is removed, the pawl 24 and the ratchet arc 25 are fully engaged, locking the pair of handles in a fixed position, and the third pivot settles in a position while the pawl 24 also rotates and settles in a position within the rotation range limited by the second pin 30 and the slot 24*f*.

FIG. 34 shows a hybrid projection view of the oil filter 60 and sectional view of the oil filter wrench of the FIG. 32 of a real-life situation, in which geometric deformation occurs to both of the first and second arm 21 and 22. In such situation the handle sections 21*c* and 22*c* are bent inwards, the ratchet arc 25 is tilted up away from the threshold 22*m* and the pawl 24 is pushed up, resulting in the linkage trigger 23 to rotate closer to the second arm 22 and the pawl 24 pivots on the third pivot in another position within the rotation range limited by the second pin 30 and the slot 24*f*, self-adapting to the ratchet arc 25's movement caused by the geometric deformation of both the first and second arms 21 and 22, while maintaining the pawl and ratchet engagement. Therefore, the majority of the previously exerted clamping energy is stored in the form of elastic deformation of the first and second arms 21 and 22, and the pair of clamping pads 27, and the strong grip on the underlining workpiece is maintained.

Working examples of abovementioned embodiments have proven the self-adaptive self-locking mechanisms provide exceptionally stable locking engagement when the clamping apparatus is undergoing significant geometric deformation.

The invention claimed is:

1. A self-adaptive self-locking clamping apparatus comprising:
- a first arm;
- a second arm;
- a ratchet arc anchored to one arm;
- a pawl subsystem anchored to the other arm via a variable pivot configured to self-adaptively engage said ratchet arc under deformation;
- an elastic member;
- wherein said first and second arms are pivotally interconnected.

2. The self-adaptive self-locking clamping apparatus of claim 1:
- Wherein said first arm comprises a longitudinal curved body having a jaw section, a pivot section and a handle section;
- Wherein said second arm comprises a longitudinal curved body having a jaw section, a pivot section and a handle section, wherein said handle section further comprises a transverse slotted cutout forming a pathway between two lateral surfaces of said handle section;
- Wherein said ratchet arc comprises a longitudinal body having an anchor end and an arc shape ratchet section, wherein said ratchet section further comprises an arc shape lateral integral ratchet face having a constant radius on one side and a lateral arc surface on the other side, thereof said arc surface is significantly concentric to said integral ratchet face;
- Wherein said pawl subsystem consists of an integrated pawl trigger having a longitudinal body comprising a pivot section, an integrated pawl section and a lever section, wherein said integrated pawl section further comprises a transverse slotted pathway sized and shaped to slidably receive said ratchet arc, such that said pathway forms at least one integral pawl tooth to couple with said ratchet face and a compressing edge on the opposing side to grip on said arc surface, thereby creating a pawl and ratchet self-locking mechanism by engaging said at least one integral pawl tooth with said ratchet face and said compressing edge with said arc surface, whereas said lever section actuates disengagement of said pawl and ratchet self-locking mechanism;
- wherein said first arm is pivotally interconnected with said second arm on the respective pivot sections, forming a first pivot as a fulcrum, a pair of jaws with at least a variable gap to clamp on a workpiece, and a pair of handles to apply clamping force;
- wherein said ratchet arc is anchored to a fixed anchoring point on said handle section of said first arm via said anchor end having said ratchet section facing said second arm;
- wherein said constant radius of said ratchet face is centered on the axis of said first pivot so that said ratchet arc is rotatable in relation to the axis of said first pivot in a path coinciding with the curve of said ratchet face;

wherein said integrated pawl trigger is pivotally connected to said second arm and facing said first arm via said pivot section forming a second pivot, thereof said second pivot forms said variable pivot which is movable within a limited range generally along the longitudinal direction of said second arm;

wherein said ratchet arc is slidably received into said pathway of said integrated pawl trigger and said pathway of said second arm in a circular motion relative to the axis of said first pivot;

wherein said elastic member is supported between said integrated pawl trigger and said second arm to provide an elastic force to urge said integrated pawl trigger pivoting on said variable pivot to rotate away from said second arm such that said compressing edge is stopped by said arc surface and said at least one integral pawl tooth is stopped by and engaged with said ratchet face, forming a directional pawl and ratchet self-locking mechanism between said pair of handles, thereby said ratchet arc is only slidable when said pair of handles rotate towards each other by overcoming said elastic force such that said compressing edge and said at least one integral pawl tooth disengage from said arc surface and said ratchet face respectively, and is engaged with said integrated pawl trigger when no overcoming counter force to said elastic force exists to prevent said pair of handles from moving apart;

wherein in situation which no geometric elastic deformation caused by the clamping force applied to said pair of handles occurs, said ratchet arc slides into said pathway of said integrated pawl trigger and said pathway of said second arm in a circular motion in relation to said first pivot such that the center of said constant radius of said ratchet face conforms to the axis of said first pivot, and when said ratchet arc is engaged with said integrated pawl trigger said variable pivot settles in a position within said limited range;

wherein in situation which geometric elastic deformation caused by the clamping force applied to said pair of handles occurs, said ratchet arc slides into said pathway of said integrated pawl trigger and said pathway of said second arm in a circular motion in relation to said first pivot such that the center of said constant radius of said ratchet face deviates from the axis of said first pivot, and when said ratchet arc is engaged with said integrated pawl trigger said variable pivot self-adapts to the changes and settles in another position within said limited range;

Wherein said variable pivot in conjunction with said directional pawl and ratchet self-locking mechanism between said ratchet arc and said pawl subsystem form a self-adaptive self-locking mechanism when said first and second arms are deformed caused by the applied clamping force; and Wherein when counter force is applied to said lever section of said integrated pawl trigger to overcome said elastic force, said integrated pawl trigger pivots on said variable pivot and rotates closer to said second arm such that said compressing edge and said at least one integral pawl tooth disengage from said arc surface and said ratchet face, allowing said pair of handles to move apart.

3. The self-adaptive self-locking clamping apparatus of claim 2, wherein said first arm further comprises said pivot section on one end, followed by said jaw section in the middle, followed by said handle section on the other end; wherein said second arm further comprises said pivot section on one end, followed by said jaw section in the middle, followed by said handle section on the other end; and wherein said first arm is pivotally interconnected with said second arm on the respective pivot sections, forming said first pivot and said fulcrum on one end, said pair of jaws to clamp on a load in the middle, and said pair of handles to exert effort on the other end.

4. The self-adaptive self-locking clamping apparatus of claim 1:

Wherein said first arm comprises a longitudinal curved body having a jaw section, a pivot section and a handle section;

Wherein said second arm comprises a longitudinal curved body having a jaw section, a pivot section and a handle section, wherein said handle section further comprises a transverse slotted cutout forming a pathway between two lateral surfaces of said handle section;

Wherein said ratchet arc comprises a longitudinal body having an anchor end and an arc shape ratchet section, wherein said ratchet section further comprises an integral arc shape lateral ratchet face having a constant radius on one side and a lateral arc surface on the other side, thereof said arc surface is significantly concentric to said integral ratchet face;

Wherein said pawl subsystem consists of a pawl and a linkage trigger;

Wherein said pawl comprises a longitudinal body having a pawl head section and a rotation limit section, wherein said pawl head section further comprises a lateral integral pawl face to couple with said ratchet face and a pivoting means on which said integral pawl face and as such said pawl pivots, whereas said rotation limit section limits the rotation of said pawl in a limited range;

Wherein said linkage trigger comprises a longitudinal body having a transversely protruding pivot section and a lever section, wherein said lever section further comprises a transverse slotted cutout adjacent to and cutting into said pivot section such that said cutout forms a pathway to slidably receive said rachet arc and pivotally receive said pawl, and said pivot section further comprises a first pivoting means and a second pivoting means;

wherein said first arm is pivotally interconnected with said second arm on the respective pivot sections, forming a first pivot as a fulcrum, a pair of jaws with at least a variable gap to clamp on a workpiece, and a pair of handles to apply clamping force;

wherein said ratchet arc is anchored to a fixed anchoring point on said handle section of said first arm via said anchor end having said ratchet section facing said second arm;

wherein said constant radius of said ratchet face is centered on the axis of said first pivot so that said ratchet arc is rotatable in relation to the axis of said first pivot in a path coinciding with the curve of said ratchet face;

wherein said linkage trigger is pivotally connected to said second arm and facing said first arm via said first pivoting means, forming a second pivot;

wherein said pawl is pivotally connected to said linkage trigger via said pivoting means of said pawl and said second pivoting means of said linkage trigger forming a third pivot, thereof said third pivot forms said variable pivot which is rotatable about said second pivot while said pawl is rotatable about said variable pivot within said limited range restricted by said rotation limit section;

wherein said ratchet arc is slidably received into said pathway of said linkage trigger and said pathway of said second arm and is slidable in a circular motion relative to the axis of said first pivot;

wherein said elastic member is supported between said linkage trigger and said second arm to provide an elastic force to urge said linkage trigger pivoting on said second pivot to rotate away from said second arm such that said pawl is stopped by and engaged with said ratchet arc, forming a directional pawl and ratchet self-locking mechanism between said pair of handles, thereby said ratchet arc is only slidable when said pair of handles rotate towards each other by overcoming said elastic force such that said pawl disengages from said ratchet arc, and is engaged with said pawl when no overcoming counter force to said elastic force exists to prevent said pair of handles from moving apart;

wherein in situation which no geometric elastic deformation caused by the clamping force applied to said pair of handles occurs, said ratchet arc slides into said pathway of said linkage trigger and said pathway of said second arm in a circular motion in relation to said first pivot such that the center of said constant radius of said ratchet face conforms to the axis of said first pivot, and when said ratchet arc is engaged with said pawl said variable pivot settles in a position while said pawl also rotates and settles in a position within said limited range;

wherein in situation which geometric elastic deformation caused by the clamping force applied to said pair of handles occurs, said ratchet arc slides into said pathway of said linkage trigger and said pathway of said second arm in a circular motion in relation to said first pivot such that the center of said constant radius of said ratchet face deviates from the axis of said first pivot, and when said ratchet arc is engaged with said pawl said variable pivot self-adapts to the changes and settles in another position while said pawl also rotates and settles in another position within said limited range;

wherein said variable pivot in conjunction with said directional pawl and ratchet self-locking mechanism between said pawl subsystem and said ratchet arc form a self-adaptive self-locking mechanism when said first and second arms are deformed caused by the applied clamping force; and wherein when counter force is applied to said lever section of said linkage trigger to overcome said elastic force, said linkage trigger pivots on said second pivot and rotates closer to said second arm such that said pawl disengages from said ratchet arc, allowing said pair of handles to move apart.

5. The self-adaptive self-locking clamping apparatus of claim 4, wherein said first arm further comprises said pivot section on one end, followed by said jaw section in the middle, followed by said handle section on the other end; wherein said second arm further comprises said pivot section on one end, followed by said jaw section in the middle, followed by said handle section on the other end; and wherein said first arm is pivotally interconnected with said second arm on the respective pivot sections, forming said first pivot and said fulcrum on one end, said pair of jaws to clamp on a load in the middle, and said pair of handles to exert effort on the other end.

6. The self-adaptive self-locking clamping apparatus of claim 2, wherein said first arm further comprises a body having said jaw section on one end, followed by said pivot section in the middle, followed by said handle section on the other end; wherein said second arm further comprises a body having said jaw section on one end, followed by said pivot section in the middle, followed by said handle section on the other end; and wherein said first arm is pivotally interconnected with said second arm on the respective pivot sections, forming a scissor linkage, said first pivot and said fulcrum in the middle, said pair of jaws to clamp on a load on one end, and said pair of handles to exert effort on the other end.

7. The self-adaptive self-locking clamping apparatus of claim 4, wherein said first arm further comprises a body having said jaw section on one end, followed by said pivot section in the middle, followed by said handle section on the other end; wherein said second arm further comprises a body having said jaw section on one end, followed by said pivot section in the middle, followed by said handle section on the other end; and wherein said first arm is pivotally interconnected with said second arm on the respective pivot sections, forming a scissor linkage, said first pivot and said fulcrum in the middle, said pair of jaws to clamp on a load on one end, and said pair of handles to exert effort on the other end.

* * * * *